United States Patent [19]
Crane et al.

[11] Patent Number: 5,022,086
[45] Date of Patent: Jun. 4, 1991

[54] HANDWRITING APPARATUS FOR INFORMATION COLLECTION BASED ON FORCE AND POSITION

[75] Inventors: Hewitt D. Crane, Portola Valley; Robert W. Hammon, San Jose, both of Calif.

[73] Assignee: SRI International, Inc., Menlo Park, Calif.

[21] Appl. No.: 287,440

[22] Filed: Dec. 20, 1988

[51] Int. Cl.$^5$ .................................................. G06K 9/62
[52] U.S. Cl. .......................................... 382/2; 382/3; 382/13; 382/17; 382/59
[58] Field of Search ........................ 382/3, 13, 17, 59, 2

[56] References Cited

U.S. PATENT DOCUMENTS

| | | | |
|---|---|---|---|
| 3,602,702 | 8/1971 | Warnock | 340/172.5 |
| 3,665,408 | 5/1972 | Erdahl et al. | 340/172.5 |
| 3,700,792 | 10/1972 | Harrison, III et al. | 378/6.8 |
| 3,767,907 | 10/1973 | Radcliffe, Jr. | 235/181 |
| 3,889,107 | 6/1975 | Sutherland | 235/152 |
| 3,906,444 | 9/1975 | Crane et al. | 340/146.3 |
| 3,915,015 | 10/1975 | Crane et al. | 73/432 R |
| 3,930,229 | 12/1975 | Crane et al. | 340/146.3 |
| 3,988,934 | 11/1976 | Kamphoefner et al. | 338/2 |
| 4,040,010 | 8/1977 | Crane et al. | 340/146.3 |
| 4,040,011 | 8/1977 | Crane et al. | 340/146.3 |
| 4,040,012 | 8/1977 | Crane et al. | 340/146.3 |
| 4,078,226 | 3/1978 | EerNisse et al. | 340/146.3 |
| 4,086,567 | 4/1978 | Crane et al. | 340/146.3 |
| 4,122,435 | 10/1978 | Greenaway | 340/146.3 |
| 4,128,829 | 12/1978 | Herbst et al. | 340/146.3 |
| 4,156,911 | 5/1979 | Crane et al. | 364/419 |
| 4,190,820 | 2/1980 | Crane et al. | 340/146.3 |
| 4,234,868 | 11/1980 | Radice | 340/146.3 |
| 4,240,065 | 12/1980 | Howbrook | 340/146.3 |
| 4,281,313 | 7/1981 | Boldridge, Jr. | 340/146.3 |
| 4,475,235 | 10/1984 | Graham | 382/3 |
| 4,475,240 | 10/1984 | Brogärdh et al. | 382/59 |
| 4,495,644 | 1/1985 | Parks et al. | 382/3 |

FOREIGN PATENT DOCUMENTS

83/01073 3/1983 PCT Int'l Appl. .
2039118 7/1980 United Kingdom .

OTHER PUBLICATIONS

Crane, Hewitt D. & John S. Ostrem, "Automative Signature Verification Using a Three-Axis Force-Sensitivie Pen", IEEE Transaction on Systems, Man, and Cybernetics, vol. SME-13, No. 3, pp. 329-337, May/Jun. 1983.

Appel, Arthur, "The Notion of Quantitative Invisibility and the Machine Rendering of Solids," Proceedings of 22nd National Conf., Assn. for Computing Machinery, A.C.M. Publication P-67, 1967, pp. 387-393.

Primary Examiner—Michael Razavi
Attorney, Agent, or Firm—Townsend and Townsend

[57] ABSTRACT

An apparatus for collecting information directly at a point on a surface comprises the combination of a stylus with means for sensing force along at least one axis in a surface at a point on the surface and a position sensing platen or pad with means for sensing a true position along at least one axis on the surface at the point in question. Collected information is processed to obtain figures of merit. Features extraction or rubbery correlation in five dimensions may be employed to obtain suitable figures of merit for objective evaluation.

12 Claims, 2 Drawing Sheets

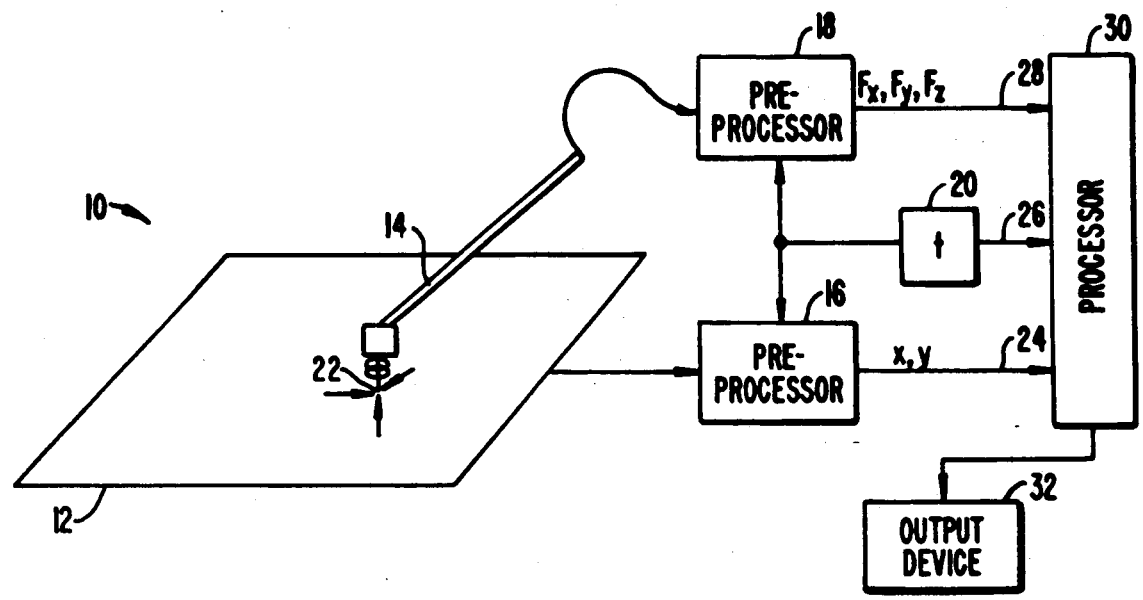
FIG._1.
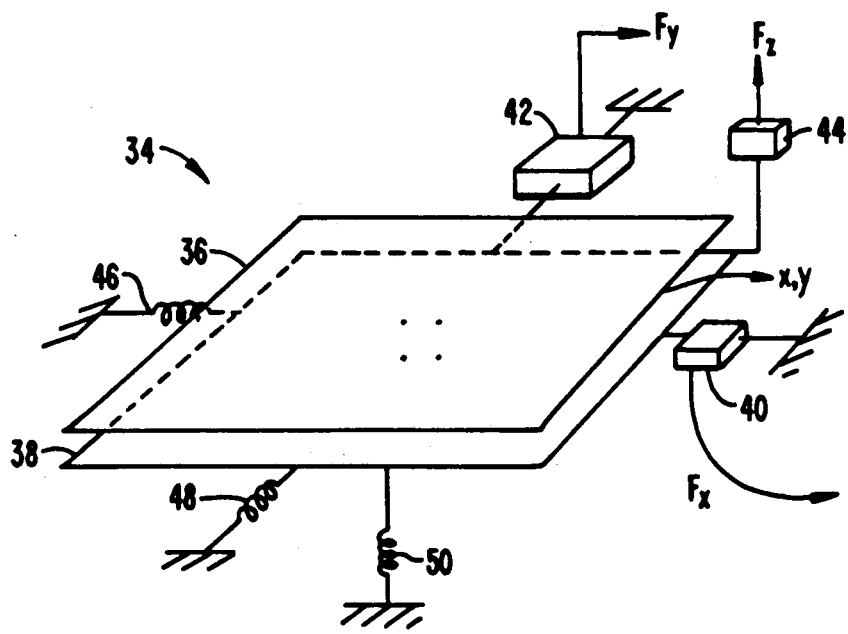
FIG._2.

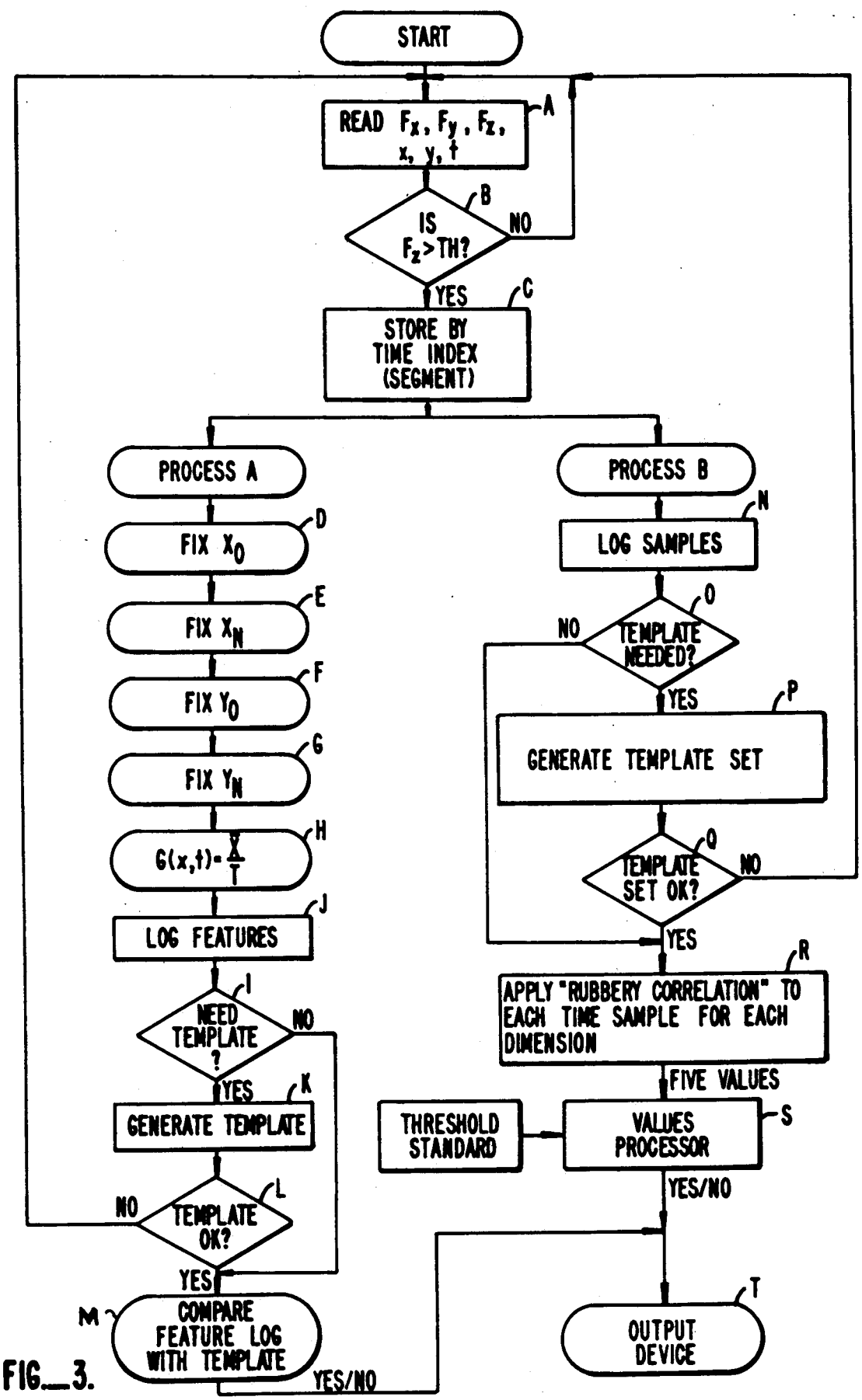
FIG._3.

HANDWRITING APPARATUS FOR INFORMATION COLLECTION BASED ON FORCE AND POSITION

BACKGROUND OF THE INVENTION

This invention relates to manual data collection and specifically to a data collection apparatus for identifying who the creator is, for identifying what the creator is doing in the form of information input, and/or for determining the neuromuscular condition of the creator. This invention relates specifically to the art of xy position and pressure recognition and information input through a stylus or similar writing instrument.

In the past, two separate technologies have developed using a stylus for data input of some form. In the first technology, techniques have been developed for recognizing xy position of a stylus on a surface. Into this class of technology fall the digitizer pads which interact with a stylus of some form to sense position of the stylus in two dimensions at the surface of the pad.

In the other technology, art has developed for tracking movement and/or forces to which a stylus is exposed. This latter technology has been used primarily for signature verification and recognition but not for data input because data input is relatively inaccurate when attempts are made to translate the information gathered through a stylus into the xy position information needed to decipher characters and the like. More specifically, it has been determined that it is virtually impossible to identify true position of a stylus on a surface derived solely from force information from a stylus because of, among other things, the interaction of forces between the stylus and the writing surface, the orientation of the stylus relative to the writing surface, including roll, pitch and yaw positioning, and the positioning of sensors within the stylus. Hence, the use of stylae has been more or less discounted as a means for pure data entry.

On the other hand, a stylus is very useful for certain classes of signature verification. For example, the automatic signature verification system using a three axis force-sensitive pen developed by one of the co-inventors of the present invention with others has been found to be a very effective tool for signature verification. The subject matter of an article published under the title "Automatic Signature Verification Using a Three-Axis Force-Sensitive Pen," *IEEE Transactions on Systems, Man & Cybernetics*, Volume SME-13, No. 3, pp. 329-337 (May/June 1983) is incorporated herein by reference and made a part hereof. This article describes a three-axis force-sensitive pen used in connection with the present invention. It also describes a method for processing signals extracted from the transducers of the force-sensitive pen.

One of the features of this prior art pen, previously recognized as useful to signature verification, is its ability to sense force at the point of the stylus on a writing surface. While inherent in the structure of the pen, the usefulness of this feature has not been recognized in other applications discussed herein, although this pen has been under development and known to the art for more than a decade. For example, attempts have been made to use such a pen for data entry and found to be inadequate to the point where a project to use such a pen for data entry was abandoned. Reference is made to the article by Crane and others entitled "An On-Line Data Entry System for Hand-Printed Characters," published in March 1977 in *Computer Magazine* pp. 43 through 50. This paper is incorporated herein by reference and made a part hereof. This paper describes the actual physical attributes of the sensing mechanism of the pen and early attempts at use of this pen for character recognition. This project was subsequently abandoned as having limited practical usefulness. One of the reasons it was abandoned was that its use required the constraint that all users hold the pen in only one manner with respect to pitch, roll and yaw.

There are other signature verification systems known to the art which are based on stylus construction. Representative of the art are patents issued to Herbst, et al., U.S. Pat. No. 4,128,829, which mentions earlier work by Herbst and others. Early work by Herbst was based on a single acceleration parameter of a signature dynamic, whereas the subsequent Herbst patent describes multiple-axis acceleration parameters in conjunction with an axial force parameter through means of accelerometers and a strain gauge measuring force along the axis of the stylus. A subtle though important feature of this prior invention is that the accelerometers measure a force of acceleration at a point other than at the junction of the writing surface with the stylus. Hence, it is virtually impossible to obtain any information about positions, either absolute or relative, at the point of intersection of the stylus and the surface. Moreover, if acceleration were measurable at the point of intersection, it would be possible to obtain direct information about relative position of the point on the surface, although it is impossible to derive absolute position. Acceleration measured at that point would not be an indication of true position at the point of intersection of the stylus and the surface. The nature of this pen as actually constructed makes it impossible to even infer position at the point due to the lack of information about the nature of the interaction of the point of acceleration and the point of intersection of the stylus on the surface. The interaction of these two positions varies between subject or users.

Xy position tablets and the like are known wherein xy position is sensed in an absolute sense and z position, including force, may well be sensed on the surface of the tablet. In any case, the force so measured is derived from the downward force interaction between a stylus and a tablet. It is believed that none of these structures use the force at the tip for any reason other than sensing contact between the stylus and the surface.

An important reference is the article by H. D. Crane and J. S. Ostrem entitled "Automatic Signature Verification Using a Three-Axis Force-Sensitive Pen", *IEEE Transactions on Systems, Man and Cybernetics*, Vol. SMC-13, No. 3, May/June 1983, pp. 329-337. This reference describes, among other things, a preferred technique for recognizing a signature as a forgery. However, the technique described therein has only limited character recognition capabilities, because it could not sense position relative to a fixed reference position.

The following patents were identified in searches of the prior art:

U.S. Pat. No. 3,767,907 to Radcliffe, Jr. discloses a technique for achieving mathematical cross-correlation in which a stylus is used in connection with a strip of film in the stylus.

U.S. Pat. No. 3,906,444 to Crane et al describes a signature verification system using a stylus with four position outputs related to x-y position and a clock output.

U.S. Pat. No. 3,915,015 to Crane et al. describes a writing instrument which uses strain gauges and which is capable of sensing force at a tip. Circuitry is disclosed which is potentially useful in connection with the present invention.

U.S. Pat. No. 3,930,229 to Crane et al. describes a handwriting system using a stylus with four position outputs related to x-y position and circuitry wherein a set of digital signals are generated to identify a character.

U.S. Pat. No. 3,988,934 to Kamphoefner et al. describes a spatial sensing apparatus for handwriting analysis.

U.S. Pat. No. 4,040,010 to Crane et al. describes a method and system for identifying handwriting using x and y and pressure input.

U.S. Pat. No. 4,040,011 to Crane et al. describes a further system for identifying handwriting using x and y and pressure input.

U.S. Pat. No. 4,040,012 to Crane et al. describes a still further system for identifying handwriting using x and y and pressure input.

U.S. Pat. No. 4,078,226 to EerNisse et al. describes a stylus for use in signature verification which generates signals representative of force in response to writing pressures. A writing surface is provided therewith in which z force, that is up/down directional force only, is sensed in connection with the forces derived from the stylus.

U.S. Pat. No. 4,086,567 to Crane et al. describes a still further system for identifying handwriting using x and y and pressure input.

U.S. Pat. No. 4,122,435 to Greenaway describes a position sensor which at most senses contact force between the writing surface and the stylus.

U.S. Pat. No. 4,128,829 to Herbst et al. has been discussed above.

U.S. Pat. No. 4,190,820 to Crane et al. describes a still further system for identifying handwriting using x and y and pressure input.

U.S. Pat. No. 4,234,868 to Radice describes a signature verification device or like pattern verification device comprising a sheet of a piezoelectric-forming resin used for gathering information related to force orthogonal to a writing surface.

U.S. Pat. No. 4,240,065 to Howbrook describes a position sensing apparatus in connection with a surface wherein a coil mounted on a stylus is used to signal proximity of the stylus to the surface.

U.S. Pat. No. 4,281,313 to Boldridge, Jr. describes a position sensing apparatus built into a surface for the intention of recognizing signatures derived from pressure against the surface.

U.S. Pat. No. 4,475,235 to Graham describes a signature verification technique relying on position and downward force against a tablet.

U.S. Pat. No. 4,475,240 to Brogardh et al. describes a system built around an optical sensor for following precision information derived from markings produced by a stylus on a surface.

U.S. Pat. No. 4,495,644 to Parks et al. describes an apparatus for real-time signature verification which uses a transducer pad in which the pressure of a stylus causes contact to be made between two resistive films to sense x and y coordinate position information. The system is described as useful for both signature verification and character recognition.

UK Patent Application GB 2,039,118A of Standard Telephone describes a signature recognition system based on a waveform identification technique verification.

Work at SRI International of Menlo Park, California, by one of the co-inventors and others is discussed in the above-mentioned papers co-authored by Crane and patents issued to Crane with others.

SUMMARY OF THE INVENTION

According to the invention, an apparatus is provided for collecting information directly at a point on a surface comprising the combination of a stylus with means for sensing force along at least one axis in a surface at a point on the surface and a position sensing pad with means for sensing a true position along at least one axis on the surface at the point in question. According to the method of the invention, the appearance of a signature or other such information in the form of written ciphers is registered simultaneously with the dynamic forces involved in creating the ciphers by measuring forces at the tip of a stylus while simultaneously sensing position of the stylus on a surface from which position can be derived relative to a fixed reference position.

The invention permits simultaneous registration of the spatial patterns and the forces associated with the creation of written ciphers. The patterns may be registered in electronic form and thereafter compared with an electronic template.

In general, there are three classes of information which can be collected using a device in accordance with the invention. The first class of information is the identity of the writer. The second class of information is the information content of the written material and the third class of information is the condition of the writer. The same basic processing can be used for all three classes of information up to the point of analysis of the information. In each case, a mechanism is needed for comparing the input information with a norm and applying an appropriate metric to establish or identify the information sought to be obtained.

For a signature verification system, the dynamics of a signature can be authenticated by correlation with the dynamic pattern associated with its creation.

The system is useful in medical applications. Information regarding the forces at the tip of the stylus can be compared with the patterns created previously by the same user in order to analyze the state of the user's neuromuscular system. A symptom of such conditions as Parkinson's disease is particularly evident as tremors and the like, which can be diagnosed by analysis of the electronic registration of the spatial and force patterns. The system might also be used to study other symptoms, including micrographia, and unusual hand and arm velocities and accelerations.

While the xy tablet alone has been found to be particularly useful in recognizing certain types of handwritten information, the additional combination of the registration or input of forces related to the creation of ciphers is useful in recognizing individual characters. Specifically, the downward analog force at the tip of a cursor can be used to substitute for, and enhance, the more conventional up/down switch of an xy tablet to provide for pen up/pen down status when used in connection with character or stroke segmentation.

The invention will be better understood upon reference to the following specific embodiments in connection with the accompanying drawings.

BRIEF DESCRIPTION OF THE DRAWINGS

FIG. 1 is a perspective view and partial schematic drawing of a first embodiment of the invention with a first embodiment of an input device suitable for use in accordance with the invention.

FIG. 2 is a perspective view of a second embodiment of an input device suitable for use in accordance with the invention FIG. 3 is a flow chart of a specific embodiment of a method in accordance with the invention.

DESCRIPTION OF SPECIFIC EMBODIMENTS

Referring now to FIG. 1, there is shown an information collection device 10 in accordance with the invention. The information collection device has two principle sensor components, xy tablet or digitizer 12 and a three-axis stylus 14. The digitizer 12 is coupled through appropriate electronic connection to a first preprocessor 16, and the stylus 14 is coupled through appropriate electronic connection to a second preprocessor 18. The preprocessors may be of the type of circuitry disclosed in U.S. Pat. No. 3,915,015. As additional inputs, each of the preprocessors may receive a timing signal from a timer 20. A timer 20 is provided for time correlation between the output of the first preprocessor 16 and the second preprocessor 18, wherein the outputs 24, 26 and 28 are respectively applied to a processor 30, whose function is as hereinafter explained. The output of the processor 30 is provided to an output device 32 for utilization by an end user.

The stylus 14, the preprocessor 18 and the interconnection therebetween in combination may be of the type described in U.S. Pat. No. 3,915,015 issued Oct. 28, 1975 to Crane et al., which is incorporated herein by reference and made a part hereof. Although other input devices can be used, the referenced stylus has the advantage that it can detect forces applied at the tip of the stylus, rather than at a position displaced from the tip of the stylus, so that one can collect accurate information about the dynamics at the tip of the stylus and not at some point displaced from tip 22. The output of the preprocessor 18 corresponds in the referenced patent to $F_x$ for forces in the x direction, $F_y$ for forces in the y direction approximately orthogonal to the x direction and $F_z$ for pressure forces orthogonal to the writing surface. (However, it is not critical that the three force directions be exactly mutually orthogonal.) The digitizer 12 and related preprocessor 16 may be a digitizer such as a Summagraphics tablet or a Talos tablet, both of which are readily commercially available. Limiting parameters in the choice of digitizer are resolution and sampling rate of the tablet. A resolution of 100 lines per inch, and preferably 200 lines per inch, and an extraction rate of 100 samples per second are generally suitable for applications contemplated. In accordance with the invention, the force information as well as the position information are synchronously extracted from both the first preprocessor 16 and the second preprocessor 18 to obtain information which is correlated in time.

FIG. 2 illustrates an alternative of the combination of a stylus and a digitizing tablet as shown in FIG. 1. FIG. 2 shows a five-dimensional platen 34. The five-dimensional platen 34 comprises a digitizer at one plane, herein top plane 36 and a force sensing platen on a second plane, herein the bottom plane 38. The bottom plane 38 may be derived from the design of the handwriting sensing and analyzing apparatus described in U.S. Pat. No. 3,988,934 issued Nov. 2, 1976 to Kamphoefner et al. Basically, three transducers are provided, an $F_x$ force transducer 40, and $F_y$ force transducer 42 and an $F_z$ force transducer 44 mounted on an appropriate suspension such as an x direction suspension 46, a y direction suspension 48 and a z direction suspension 50.

The top plane 36 may be a membrane having embedded therein position sensors from which x and y position can be derived for output to an appropriate preprocessor. Pressure from an ordinary stylus or writing instrument on the membrane of the top plane 36 thereby causes the generation of both position information and force information since the membrane is intended to be in contact with the underlying bottom plane throughout the active area of the bottom plane 38.

Each of the embodiments of FIG. 1 and FIG. 2 have particular advantages. The apparatus of FIG. 2 allows a user to use virtually any writing instrument. However, other pressures, such as palm pressure against the writing surface, can produce spurious artifacts. Moreover, the apparatus of FIG. 1 is likely to produce the more consistent signals, since the same writing instrument is always used.

It should be understood that the output signals can be in the form of analog voltages or, depending on the nature of the transducer, a direct digital signal correlated in time.

FIG. 3 is a flow chart for illustrating the basic processing operations of the processor 30 of FIG. 1. The information so obtained can be processed in real time or it can be stored for later analysis.

The first step is to read the values of the signals $F_x$, $F_y$, $F_z$, x, y, and t, where t is the time, such that all of the information read is time-correlated (Step A). Thereafter, the force vector in the z direction is tested to determine whether it is above a predetermined or dynamic threshold (Step B). The threshold indicates that contact has occurred between the stylus and the tablet and that the collection of the parametric information should begin. If the z force does not exceed the threshold, the first step is repeated until the threshold is exceeded. Once the threshold has been exceeded, the data is gathered by sampling techniques into appropriate temporary storage registers or memory indexed according to time (Step C). (Alternatively, the information can be applied directly to processors which perform cumulative analysis of the incoming data until a terminating signal is received. The process herein described however, assumes that at least a definable segment of values is collected before analysis is performed. In fact, one of the steps in storing by time index, is to segment the information based on a signal indicating whether the stylus is up or in contact with the tablet thereby to separate the information by stroke.) Step C is completed when a termination signal is received, such as a timeout after "pen-up," the last occurrence of $F_z$ below the pre-established threshold.

With information segmented by stroke, each writing stroke can be individually analyzed, or the segments can be analyzed as a group. Two types of processing can be applied thereafter in accordance with the invention. The first type of processing is a five-dimensional features extraction process.

Alternatively, a five-dimensional correlation process may be applied. Ultimately, a yes/no decision can be derived from the applied processes for those types of analyses where a simple yes/no decision is appropriate. Moreover, both processes can be conducted in parallel, and the outputs from each can be combined appropriately, if it is found that one or the other did not provide satisfactory information for the intended purposes.

The first process, herein called the parametric process, is an extension of the three-dimensional process described in U.S. Pat. No. 4,040,010 to Crane et al. issued Aug. 2, 1977, the content of which is incorporated herein and made a part hereof. According to Process A, analog signals are digitized and processed to extract a set of descriptors, herein called "features" from the five signals. These features include timing parameters such as the total time of the activity, the average force in each of the three force vectors, the number of stylus ups and stylus downs and the like. More specifically, Process A establishes a starting point in x ($x_O$ Step D) and ending point in x ($x_N$ Step E) a starting point in y ($y_O$ Step F) and an ending point in y ($y_N$ Step G). This information is derived from the segment information previously collected.

For parametric calculations, it is often helpful to establish a baseline for $F_x$ and $F_y$. However, the "average" force parameters, that is, the average force in the x direction over the duration of a stroke, are of most relevance. A baseline function g(x,t) can be established which is equal to the average of x over the length of time of the process (Step H). Similarly, an average value can be computed for $F_y$.

Having established the baseline for the x values and the y values, the process then logs all of the features for each of the five axes in force and position. Suggested features for both $F_x$ and $F_y$ are as follows: scaled mean, standard deviation, minimum, maximum, average absolute, average positive, number of positive samples, average negative, number of negative samples, number of zero crossings, maximum minus scaled mean, maximum minus minimum, and scaled mean minus minimum. In addition, the following features may be logged: Total time, number of segments, time up and time down. It should be noted that not all of these features are necessary for analysis, but have been found useful for signature verification.

Prior to any decision-making application in accordance with the invention, it is necessary to generate a template (Step K). A template is generated by collecting the logged features and identifying the template with a particular norm. If the norm is a signature of a user, then the norm is identified with the user. If the norm is the writing sample of the user indicating normal condition, then the sample is identified as a normal condition. If the template is used for character recognition, then the template needs to be identified with a particular character or segment of a character or set of characters. Following the template generation step, a test is made to determine whether the template is adequate (Step L). This step may be performed in non-real-time or off-line as it is based on an accumulation of factors that may be subjective. Having captured a template, it should be understood that the template may be changed by substitution or addition to improve its reliability.

Finally, the step of identifying a condition, a signature or a unit of information involves comparing the feature log from Step J with the template of Step K (Step M). To this end, a calculation such as a root-mean-square analysis can be performed on each of the features for each of the axes by applying an appropriately weighted Euclidean distance metric. A cumulative distance metric can be calculated by summing the features over all of the cumulative distance metrics.

The basic criteria used to judge whether, for example, a particular test signature was a true signature or an attempted forgery are as follows:

Let s be the feature vector representing the test signature. The components of s are the values of the set of "best" features determined by the method described earlier. Let t be the computer-stored template or reference vector and $\sigma$, the associated standard deviation vector. The determinations of t or $\sigma$ are based on an enrollment set of known true signatures, and the measure of closeness between the test signature and the template can be determined by, for example, the weighted Euclidean distance metric given by:

$$d(s,t) = \left( 1/f \sum_{i=1}^{f} ((s_i - t_i)/\sigma_i)^2 \right)^{\frac{1}{2}}$$

where f is the number of features, $s_i$ is the value of the ith component or feature in the feature vector s, $t_i$ is the ith component of the template vector, and $\sigma_i$ is the standard deviation of the ith feature as computed from a set of enrollment signatures. The smaller the calculated value of d(s,t), the greater the similarity between s and t, and therefore between the test signature represented by s and the computer-stored template t.

The decision rule for deciding whether a particular test signature satisfies the verification criteria is as follows:

If $d(s, t) \leq d^{thres}$, the signature is judged to be a true signature.

If $d(s, t) > d^{thres}$, the signature is judged to be an attempted forgery.

The quantity $d^{thres}$ is a preassigned threshold value selected to obtain the optimum trade-off between errors for the particular application of interest. For example, for high-security applications, $d^{thres}$ would likely be set to a relatively small value to minimize the impostor-acceptance rate, while for banking applications involving relatively small amounts of money, where the concern is usually to minimize user inconvenience, a larger value for $d^{thres}$ might be more suitable. Further information on these tests are found in an article by H. D. Crane and J. S. Ostrem entitled "Automatic Signature Verification Using a Three-Axis Force-Sensitive Pen", *IEEE Transactions on Systems, Man and Cybernetics*, Vol. SMC-13, No. 3, May/June 1983, pp. 329–337.

If the distance metric is determined to be less than or equal to the pre-established threshold, the signature, information or condition is judged to be normal or true. If it is greater than the pre-established threshold, the signature, information or condition is judged to be abnormal. The quantity of the threshold can be a preassigned threshold value selected by using empirically-gathered information indicating a level of integrity designed to eliminate unacceptable false rejections occurring because the threshold is too strict, or it can be a value that differs for each "transaction," depending on the importance of the particular "transaction."

Process B is a correlation process which employs sampled data techniques similar to those described in U.S. Pat. No. 4,040,012 to Crane et al. issued Aug. 2, 1977, which is incorporated herein by reference and made a part hereof.

The first step in the correlation process is to log samples of the waveforms of the entire input to be examined (Step N). The waveforms represent independent components of all five dimensions of the input data, each of which is correlated with time. A test is then conducted to determine whether an adequate template is present (Step O). If no adequate template is present, a template is needed and therefore a template set is generated which consists of a set of waveform patterns of the stroke information (i.e., a waveform pattern for each axis), or an average of several such waveforms, instead of a set of measures or features, derived from each waveform as described above. It is therefore understood that several samples of the input data are generally examined empirically to obtain a reliable template set (Step P).

The template set is tested to determine if the template set is adequate (Step Q). The test may involve, for example, testing the standard deviation values obtained by applying a logged sample against the stored waveform templates by means of the "rubbery correlation" method described hereinbelow, to verify that they fall within the accepted range (Step R).

Once sufficient information has been collected to establish a template, whether the template is for signature verification, character recognition or condition of the writer, that template set can be compared with logged samples (from Step N). A correlation step is invoked whereby "rubbery correlation" is applied to each time sample for each of the five dimensions (Step S). One-dimensional rubbery correlation is explained at length in connection with the calculations from the above-referenced U.S. Pat. No. 4,040,012. Rubbery correlation is a technique whereby standard mathematical correlation is applied to each time sample multiple times with dynamic time warping and/or scaling of segment size of the input information against the template. The difference herein is that the rubbery correlation processes are applied in five dimensions. The nature of the signals, namely, pressure signals and spatial information signals, are of substantially different character. However, the combination of the information enables use of a five-dimensional template set to verify the shape of a signature with the dynamics of the signature, the shape and dynamics of character creation, or an alphabet, or to identify the condition of the user, such as whether the user is suffering from a neuromuscular dysfunction. Examples of detectable neuromuscular dysfunctions are Parkinson's disease, or impairment of muscular response due to a narcotic or stimulant or the like. Use of the invention for the latter test is particularly useful for neurological screening of equipment operators.

Once the rubbery correlation step is completed, five independent values have been obtained, each of the values representing a figure of merit for each of the five dimensions. The five values can be passed to a values processor which combines the five values to obtain a single figure of merit to be compared to obtain a go/no-go or a yes/no output (Step S). Thus, an extremely complex calculation has been reduced to one figure of merit, which can be passed to an output device (Step T).

A purely objective test may then be employed to analyze dynamic and spatial information generated by a stylus on a tablet.

It should be recognized that subjective evaluation can also be applied to the information collected by the apparatus according to the invention. For example, under the first process hereinabove, the features which are logged for each dimension may be individually examined by a trained analyst to determine, based upon experience and judgment, features which may not otherwise be analyzed. This may be particularly useful in a medical setting or in a signature verification context where unique characteristics related to the formation of a certain character are to be examined.

The invention has now been explained with reference to specific embodiments. Other embodiments will be apparent to those of ordinary skill in the art. It is therefore not intended that this invention be limited, except as indicated by the appended claims.

What is claimed is:

1. An apparatus for gathering and collecting handwritten information based upon force and position of a writing instrument comprising in combination:

a tablet means for sensing a first position component along a first axis in a Cartesian coordinate system and for sensing a second position component along a second axis in said Cartesian coordinate system transverse to said first axis;

force sensing means within said writing instrument for sensing force generated by the writing instrument about a point at the intersection of said first axis and said second axis, said force being expressible in third, fourth and fifth spatial axes related to orientation of said writing instrument, said force sensing means including:

means for sensing a first force component in said third axis, means for sensing a second force component in said fourth axis transverse to said third axis, and means for sensing a third force component in said fifth axis transverse to said third axis and said fourth axis;

means for logging, with respect to time, said first position component, said second position component, said first force component, said second force component and said third force component to produce logged position and force information; and means responsive to said logged position and force information for combining said logged position and force information to produce output information.

2. The apparatus according to claim 1, wherein said combining means comprises a features log for receiving said logged position and force information, means for generating a features template, said features template comprising a collection of logged features of said features log and an identification with a specific norm, means for storing said features template and means coupled to said features log and to said features template storing means for comparing said features template with said features log to produce a figure of merit.

3. The apparatus according to claim 1, wherein a template set for said features template storing means comprises mean values and standard deviation values for each time segment of said position information and force information with logged samples and means for correlating said template set with logged samples to produce a figure of merit for each of said positions and forces.

4. The apparatus according to claim 3, further including means for combining said position and force figures of merit into a single value for comparison with a standard.

5. A method for gathering and collecting information based upon force and position of a stylus point of a writing instrument, said method comprising the steps of:
- (a) sensing a first position component of a stylus point along a first axis in a Cartesian coordinate system with respect to time;
- (b) sensing a second position component of said stylus point along a second axis in said Cartesian coordinate system transverse to said first axis with respect to time;
- (c) sensing a first force component at said stylus point at an intersection of said first axis and said second axis in a third axis related to orientation of said writing instrument with respect to time;
- (d) sensing a second force component at said stylus point at said intersection of said first axis and said second axis in a fourth axis related to orientation of said writing instrument transverse to said third axis with respect to time; and
- (e) sensing a third force component at said stylus point at an intersection of said first axis and said second axis in a fifth axis related to orientation of said writing instrument transverse to said third axis and to said fourth axis with respect to time;
- (f) logging, with respect to a common time reference, said first position component, said second position component, said first force component, said second force component and said third force component to obtain force and position information relative to a common stylus point which is time correlated;
- (g) combining said first and second position components and said first, second and third force components to produce output information; and
- (h) providing said output information to an output device.

6. The method according to claim 5 wherein said combining step comprises the step of comparing logged position information and force information of an input with a template set to obtain figures of merit relative to a reference.

7. The method according to claim 6 further including obtaining a single figure of merit as said output information.

8. The method according to claim 6 wherein said comparing step comprises applying a rubbery correlation process in five dimensions corresponding to said first, second, third, fourth and fifth axes to obtain five figures of merit.

9. The method according to claim 6 wherein said comparing step comprises extracting features in five dimensions corresponding to said first, second, third, fourth and fifth axes, said features including total time of activity, average force along said third, fourth and fifth axes, and average distance along said first and second axes.

10. The method according to claim 5 further including the step of repeating said steps (a) through (g) a plurality of iterations under controlled conditions to establish a reference in the form of a template set.

11. The method according to claim 6 wherein said comparing step includes applying a root mean squared analysis between said logged information and information of said template set.

12. The method according to claim 9 wherein said comparing step includes applying a root mean squared analysis between said logged information and information of said template set.

* * * * *